(12) United States Patent
Kim

(10) Patent No.: US 10,068,564 B2
(45) Date of Patent: Sep. 4, 2018

(54) AUDITORY INFORMATION SECURITY SYSTEM

(71) Applicant: SHIELDK CO., LTD., Seoul (KR)

(72) Inventor: Sang-Hwan Kim, Siheung-si (KR)

(73) Assignee: SHIELDK CO., LTD., Ansan-si (KR)

( * ) Notice: Subject to any disclaimer, the term of this patent is extended or adjusted under 35 U.S.C. 154(b) by 0 days.

(21) Appl. No.: 15/561,520

(22) PCT Filed: Dec. 14, 2015

(86) PCT No.: PCT/KR2015/013691
§ 371 (c)(1),
(2) Date: Sep. 25, 2017

(87) PCT Pub. No.: WO2016/153149
PCT Pub. Date: Sep. 29, 2016

(65) Prior Publication Data
US 2018/0068647 A1    Mar. 8, 2018

(30) Foreign Application Priority Data

Mar. 26, 2015    (KR) ........................ 10-2015-0042140

(51) Int. Cl.
| | | |
|---|---|---|
| *G10K 11/175* | (2006.01) | |
| *H04K 3/00* | (2006.01) | |
| *H04B 11/00* | (2006.01) | |
| *G10K 15/02* | (2006.01) | |
| *G10L 21/0208* | (2013.01) | |

(Continued)

(52) U.S. Cl.
CPC ............ *G10K 11/175* (2013.01); *G10K 15/02* (2013.01); *H04B 11/00* (2013.01); *H04K 3/827* (2013.01); *G10L 21/0332* (2013.01); *G10L 2021/02082* (2013.01)

(58) Field of Classification Search
None
See application file for complete search history.

(56) References Cited

U.S. PATENT DOCUMENTS

2009/0093211 A1*   4/2009   Chu ........................ H04K 3/43
455/1

FOREIGN PATENT DOCUMENTS

| JP | 2001-086101 A | 3/2001 |
|---|---|---|
| KR | 10-0731816 B1 | 6/2007 |

(Continued)

OTHER PUBLICATIONS

International Search Report of PCT/KR2015/013691, dated Sep. 29, 2016, Shieldk Co., Ltd.

(Continued)

*Primary Examiner* — Curtis Kuntz
*Assistant Examiner* — Kenny Truong
(74) *Attorney, Agent, or Firm* — Monami Law Group PLLC; Eunyoung Lee

(57) ABSTRACT

The present invention relates to an auditory information security system and, more specifically, to an auditory information security system for preventing illegal leakage of auditory information by transmitting security signals, which are unspecified noise signals within a preset frequency band among frequency bands that the human ear cannot hear, and then, preventing the auditory information, including voices and sounds occurring in a specific area where wiretapping or recording is expected, from being collected by a wiretap or recorder.

4 Claims, 3 Drawing Sheets

(51) Int. Cl.
*G10L 21/0332* (2013.01)
*H04K 1/02* (2006.01)

(56) References Cited

FOREIGN PATENT DOCUMENTS

| KR | 10-2008-0048380 A1 | 6/2008 |
| KR | 10-1462427 B1 | 11/2014 |
| KR | 10-1462472 B1 | 12/2014 |
| KR | 10-2006-0021803 A1 | 3/2016 |

OTHER PUBLICATIONS

ISA Opinion Letter of PCT/KR2015/013691, dated Nov. 21, 2016, Shieldk Co., Ltd.

* cited by examiner

AUDITORY INFORMATION SECURITY SYSTEM

CROSS-REFERENCE TO RELATED APPLICATION

This application is the National Stage of International Application No. PCT/KR2015/013691, filed on Dec. 14, 2015, which claims the benefit of and priority to Korean Patent Application No. 10-2015-0042140, filed on Mar. 26, 2015, which are herein incorporated by reference in its entirety.

TECHNICAL FIELD

The present invention relates to an audio information security system or an auditory information security system, and more particularly, to an audio information security system or an auditory information security system that employs an unspecified and inaudible noise signal as a security signal to prevent audio information such as voice, sound, etc. from being illegally collected by a eavesdropping or recording device in a target area where eavesdropping is expected. The security signal may have a preset frequency which is inaudible to human.

BACKGROUND ART

Due to the development of information and communication technology, there are various social problems due to a leakage of information. In other words, with the development of various wireless communication devices at present, various illegal eavesdropping devices and hidden cameras are abused and seriously infringe privacy and human rights of individuals.

Therefore, most countries are making efforts to respond this issue through legal regulations and policies. Individuals also try to prevent exposure to illegal eavesdropping and hidden camera by using various detection devices that can detect the eavesdropping and hidden camera at the individual level.

As a result of the above efforts, a technique has been proposed in Korean Patent Publication No. 10-2006-0021803, entitled apparatus detecting and preventing a portable wire/wireless hidden tapping device, a laser hidden tapping device, and a hidden camera. In the publication, a precise position transmitted to/from a wireless eavesdropper can be searched easily without a user operation by measuring the field intensity of radio frequency transmitted from a wireless eavesdropping device and comparing whether the measured electric field intensity is higher than reference electric field intensity.

In addition, Korean Patent Publication No. 10-2008-0048380, entitled propagation detection method for an illegal wireless device, a propagation detection circuit, and a mobile phone equipped with the propagation detection circuit, proposed a technique to detect a radio signal transmitted from a wireless eavesdropping device and a hidden camera. The device receiving and processing the signal is integrated in a form of a micro device and a chip, modularized into a single chipset, and incorporated in a mobile phone to independently perform its function.

In addition to the above described techniques, conventional art proposes a method for preventing eavesdropping and recording by generating white noise to prevent eavesdropping or recording by an eavesdropping device.

When a sound A and a sound B coexist and the sound wave B has larger amplitude than the sound wave A, the sound wave A is not heard to a human ear. In this case the sound wave A is masked by the sound wave B, and this phenomenon is called a masking effect.

On the other hand, electrical or mechanical devices such as a microphone for receiving sound waves collect only sound waves. When an unspecified noise is mixed up, the original sound waves are masked by the noise and thus sound reception ability is limited. An eavesdropping device should be located within a sound field, which is a place where sound waves exists, to collect conversations or conversations.

A method of preventing eavesdropping using white noise applies a masking effect and interferes with target sound waves received by a microphone of the eavesdropping device by providing unnecessary sound wave (noise). As shown in FIG. 1, the method of preventing eavesdropping using white noise generates noise having an audible frequency band to cause a masking effect. The noise having the audible frequency band prevents the target sound waves, i.e., the original conversation waves, from being tapped, wiretapped or recorded.

FIG. 2 shows how to generate the white noise. A collector of the transistor A is laid open, and a base and an emitter are combined to generate the noise of the transistor (A). The noise, then, is passed to the BPF (B: Band Pass Filter). The BPF (2) filters only the noise within 20 Hz to 20 kHz, which is a desired audible frequency band. The filtered noise is amplified by an AMP (3: Audio Amplifier) and output through the speaker (4).

As mentioned above, the conventional method for preventing eavesdropping using white noise generates a white noise in an audible frequency band and works only when white noise has intensity larger than intensity of a target sound wave, e.g., a human voice. This is disadvantageous to use.

The conventional method is disadvantageous in that: (i) the white noise is generated during a conversation between subject parties, and thus the subject parties may easily notice that their conversation is tapped or wiretapped; (ii) the noise generator should be closely positioned to a target area where the conversation is exchanged, (iii) it is difficult to use when the target area is wide, and (iv) the noise is too loud, making the conversation or the communication difficult.

Problem to be Solved

The present invention solves the above-mentioned problems by employing an unspecified and inaudible noise signal as a security signal. The unspecified and inaudible noise signal has a preset frequency band and prevents audio information such as voice, sound, etc. from being illegally collected by a eavesdropping or recording device.

Solution to the Problem

An audio information security system or an auditory information security system according to an embodiment of the present invention includes a frequency generating unit (11), a control unit (12), a modulating unit (13), and a transmit unit (14). The frequency generating unit (11) generates a frequency.

The control unit (12) generates a control signal. The control signal controls the frequency generated by the frequency generating unit to obtain a security signal. The security signal has a given wavelength and intensity. The security signal is a single-channel or a multi-channel security signal. The control signal further controls a selective transmission of the security signal.

The modulating unit (13) modulates the frequency generated by the frequency generating unit according to the control signal from the control unit to generate the single channel or the multi-channel security signal.

The transmit unit (14) (i) is placed in the target area where eavesdropping or recording is expected, (ii) amplifies the security signal of a preset channel under the control of the control unit, and (iii) outputs the amplified security signal to the outside when the modulating unit generates the security signal.

The control unit (12) generates a control signal. The control signal controls the frequency generated by the frequency generating unit to obtain a security signal. The security signal has a given wavelength and intensity. The security signal is a single-channel or a multi-channel security signal. The control signal further controls a selective transmission of the security signal. The control signal further controls a transmission of the security signal when target audio information is detected within a target area and the detection continues for a preset period of time.

The modulating unit (13) modulates the frequency generated by the frequency generating unit according to the control signal from the control unit to generate the single channel or the multi-channel security signal.

The transmit unit (14) (i) is placed in the target area where eavesdropping or recording is expected, (ii) amplifies the security signal of a preset channel under the control of the control unit, and (iii) outputs the amplified security signal to the outside when the modulating unit generates the security signal.

Advantages of the Invention

According to an embodiment of the present invention, a security signal has an inaudible frequency band and has intensity stronger than the target audio information such as a human voice. Thus, when captured by eavesdropping or the recording device, the target audio information is masked by the inaudible security signal, preventing illegal eavesdropping and/or recording.

Furthermore, in addition to masking the target audio information as described above, the present invention can disarm the eavesdropping device itself. Specifically, when the inaudible security signal may cause accumulated electric charges of a condenser microphone of an eavesdropping device to be saturated and thus can lead an overcurrent flowing, thus preventing tapping, wiretapping or recording. This makes the eavesdropping device disarmed or inoperable.

Furthermore, according to the present invention, the security signal can be controlled to be transmitted only when detection of audio information continued for a preset period of time within a target area where the eavesdropping or recording is expected. Thus, a continued or frequent transmission of the security signal is refrained. This feature can minimize a negative effect to a human body or minimize undesired interference with a normal operation of electrical devices placed in the target area. This feature is also advantageous in reducing power consumption of an audio information security system.

DETAILED DESCRIPTION OF THE INVENTION

Figure 1:
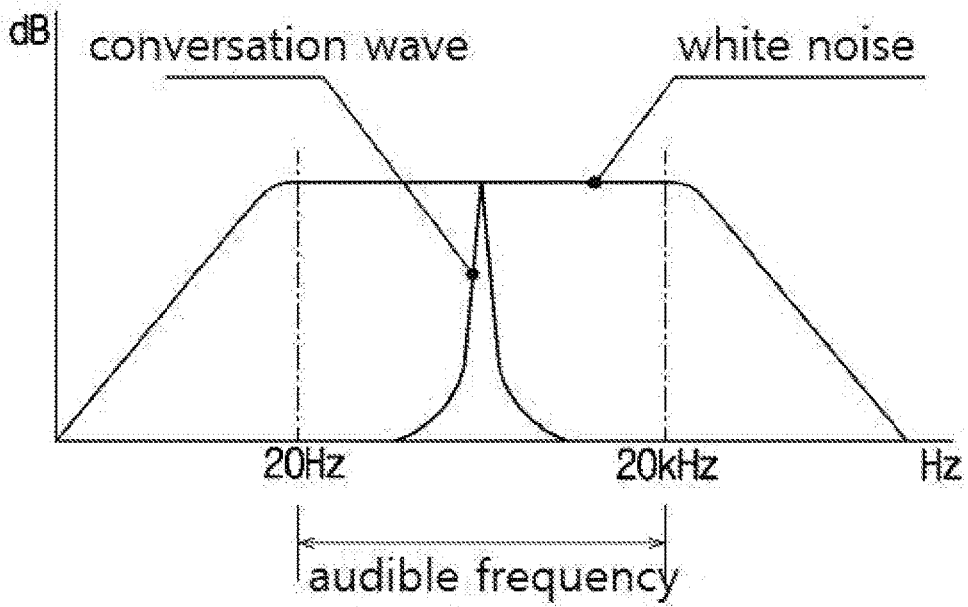
FIG. 1 is a waveform diagram for explaining the principle of a conventional anti-eavesdropping apparatus using white noise.
Figure 2:
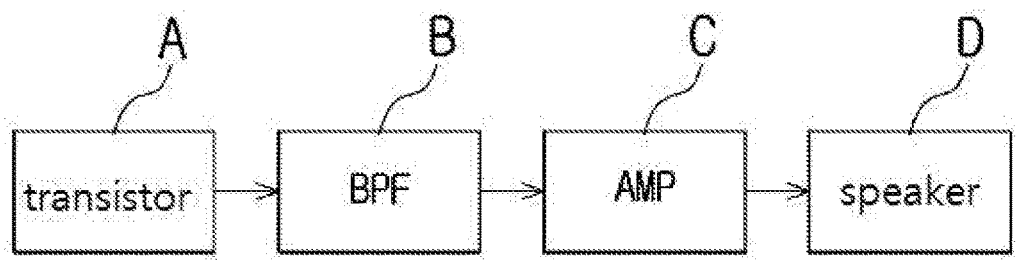
FIG. 2 is a block diagram for explaining a conventional anti-eavesdropping device using white noise.
Figure 3:
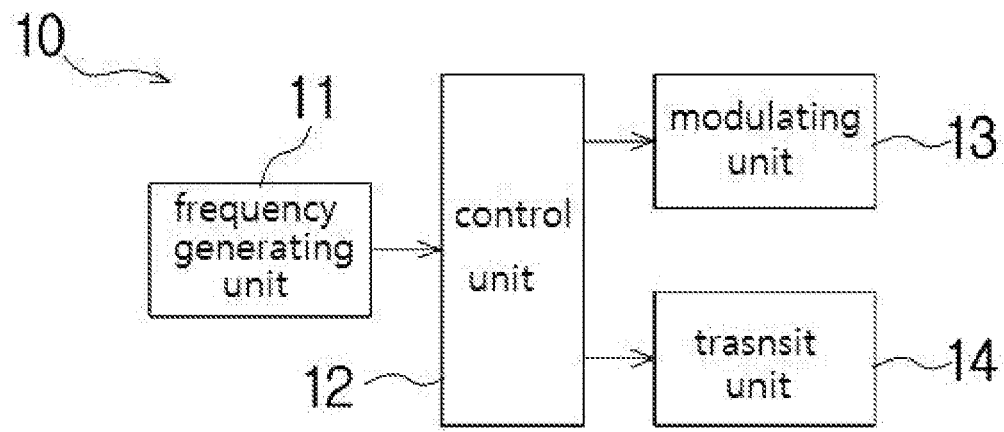
FIG. 3 is a block diagram according to an embodiment of the present invention.

The present invention will now be described with reference to the accompanying drawings. An audio information security system or an auditory information security system (10) according to an embodiment of the present invention is shown in FIG. 3 and includes a frequency generating unit (11), a control unit (12), a modulating unit (13), and a transmit unit (14). The frequency generating unit (11) generates a frequency.

The control unit (12) generates a control signal. The control signal controls the frequency generated by the frequency generating unit to obtain a security signal. The security signal has a given wavelength and intensity. The security signal is a single-channel or a multi-channel security signal. The control signal further controls a selective transmission of the security signal.

The modulating unit (13) modulates the frequency generated by the frequency generating unit according to the control signal from the control unit to generate the single channel or the multi-channel security signal.

The transmit unit (14) outputs, according to the control signal of the control unit (12), the security signal generated by the modulating unit (13) to the outside.

In an embodiment of the present invention, the frequency generating unit (11) is a frequency generating circuit. In another embodiment, the frequency generating unit (11) is a frequency generator that includes a frequency generating circuit. The frequency generating unit (11) generates a frequency between ultra-low frequency bands and an ultrasonic wave band. Alternatively, the frequency generating unit (11) generates an inaudible frequency to human.

Meanwhile, the control unit (12) of the present invention may be a program or a main control unit (MCU) equipped with a logic circuit to control the frequency generated by the frequency generating unit (11). The control unit (12) controls the frequency generated from the frequency generating unit (11) to obtain a security signal. The security signal may be a single-channel or a multi-channel frequency and have a desired wavelength and intensity (decibel (dB)). The control unit (12) further controls a selective transmission of the security signal.

For reference, the ultra-low frequency sound is 0 Hz to 16 Hz, and the human audio frequency band is 20 Hz to 20,000 Hz. The best sound frequency human can hear at a given amplitude is 3,000 to 4000 Hz. The best sound frequency is 50 Hz~16 kHz for adults, and 12 kHz for women, and 5 Khz for men. The ultrasonic wave has a frequency higher than 20 kHz. In an embodiment, the security signal may have a frequency of 20 Hz~25 kHz, and more preferably 19 kHz~25 kHz.

In an embodiment, the security signal of the present invention may be a single channel incorporating the entire 19 kHz to 25 kHz band. In another embodiment, the security signal may be a multiple-channel. The multiple-channel may be obtained by dividing the entire band of 19 kHz to 25 kHz into from two bands to 45 bands, or by dividing the entire band of 20 Hz to 25 kHz into from two bands to 45 bands. In an embodiment, the higher the frequency band is, the higher decibel (dB) of the frequency is.

In an embodiment, the modulating unit (13) may include a digital circuit, e.g., a switching transformer. The modulating unit (13) modulates the frequency generated by the frequency generating unit (11) according to a control signal of the control unit (12) and outputting the modulated signal as the single-channel or multi-channel security signal. In an embodiment, the switching transformer may be a high-frequency oscillating circuit, a switching circuit, or a high-frequency transformer.

The transmit unit (14) of the present invention may include an amplifier and a transmitter. The amplifier amplifies the security signal output from the modulating unit (13) to such a level as suitable for transmission to the outside. The transmitter outputs the amplified security signal to the outside according to the control signal of the control unit (12). In an embodiment, the transmitter may be an antenna including an RF module or an ultrasonic sensor.

Hereinafter, the operation of the present invention will be described. First, an embodiment of the present invention includes a frequency generating unit (11), a control unit (12), a modulating unit (13), and transmit unit (14).

The control unit (12), according to a preset control value, generates a control signal which (i) controls the frequency generated by the frequency generating unit (11) to obtain a security signal, e.g., a single-channel or multi-channel security signal, having a desired wavelength and intensity and (ii) controls a selective transmission of the security signal.

The modulating unit (13) modulates the frequency generated by the frequency generating unit (11) according to the control signal of the control unit (12) to generate the security signal, e.g., the single-channel or multi-channel security signal.

The transmit unit (14) transmits the security signal output from the modulating unit (13) to the outside according to the control signal of the control unit (12). In an embodiment, the frequency generating unit (11) may be a frequency generating circuit or a frequency generator equipped with a frequency generating circuit. The frequency generated by the frequency generating unit (11) is between the ultra-low frequency band and the ultrasonic wave band. That is, the frequency may be in the range of 0 Hz to 25 kHz. The control unit (12) controls, according to the preset control value, the frequency generated by the frequency generating unit (11) to obtain the security signal, e.g., the single-channel or the multi-channel security signal, having a desired wavelength and intensity (dB). That is, the control unit (12) may control the switching transformer of the modulating unit (13) using a program, a logical operation, or a voltage level adjustment and output the security signal of a preset channel.

The security signal may be a single channel or multiple signals. The single channel is a channel that integrates the entire 19 kHz to 25 kHz band The multi-channel is formed by dividing the entire 19 kHz to 25 kHz band into multiple bands, e.g., into 2-45 bands or by dividing the entire 120 Hz to 25 kHz band into multiple bands, e.g., into from two to 45 channels. The higher the frequency is, the higher a value of decibels (dB) is.

The switching transformer of the modulating unit (13), according to the control signal of the control unit (12), (i) generates the security signal, e.g. the single-channel or the multi-channel security signal by modulating the frequency generated by the frequency generating unit (11) using a program, a logical operation, or a voltage level adjustment, and (ii) outputs the security signal, i.e., the single-channel or the multi-channel security signal.

The security signal output as such is amplified to such a level as suitable for transmission to the outside via the amplifier of the transmit unit (14). The amplified security signal is transmitted to the outside through an antenna including an RF module or through an ultrasonic sensor.

Figure 4:
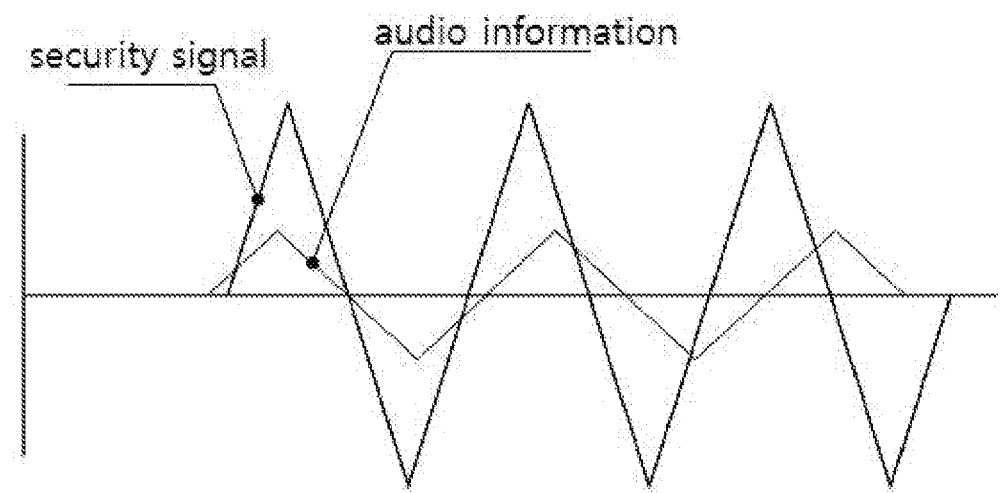
FIG. 4 is a waveform diagram according to an embodiment of the present invention in which target audio information masked by a security signal.

When the security signal is transmitted as described above, as shown in FIG. 4, the security signal is collected along with the target audio information, such as voice, sound by an eavesdropping or recording device. The security signal may be stronger than the frequency intensity of the target audio information such as a person's voice, and thus the target audio information is collected by the eavesdropping and/or recording related device as masked by the security signal. Therefore, illegal eavesdropping and/or recording can be blocked.

Further, in another embodiment of the present invention, in addition to securing audio information by masking as described above, the illegal eavesdropping and/or recording operation can be inoperative since the security signal may cause the accumulated electric charge of a condenser microphone of an eavesdropping device saturated and thus lead an overcurrent to flow through the eavesdropping device.

Figure 5:
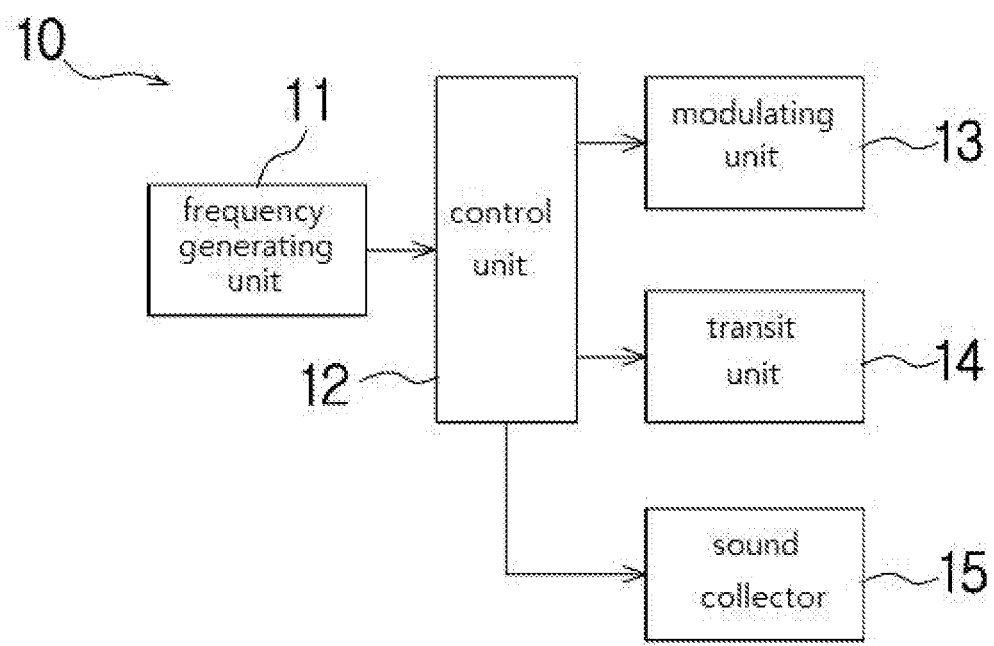
FIG. 5 is a block diagram according to another embodiment of the present invention.

In another embodiment of the present invention, as shown in FIG. 5, the audio information security system may include a frequency generating unit (11); a control unit (12); a modulating unit (13); and a transmit unit (14).

The frequency generating unit (11) generates a frequency. The control unit (12) generates a control signal which (i) controls the frequency generated by the frequency generation (11) to obtain a security signal, e.g., a single channel or a multi-channel security signal, having a desired wavelength and intensity according to a preset control value and (ii) controls a selective transmission of the security signal when target audio information is sensed continuously for a preset period of time in a target area where eavesdropping or recording is expected.

The modulating unit (13), according to a control signal of the control unit (12), modulates the frequency generated by the frequency generating unit (11) to generate the security signal, e.g., the single channel or the multi-channel security signal.

The transmit unit (14) is placed in the target area where eavesdropping or recording is expected. The transmit unit (14), under the control of the control signal of the control unit (12), amplifies and outputs to the outside the security signal which is generated by the modulating unit (13) and is carried on a preset channel.

In an embodiment, a sound collector (15) may detect the audio information in the target where eavesdropping or recording is expected. The audio information collected by the sound collector (15) is converted into a digital signal via an analogue-digital converter (A/D converter) and provided to the control unit (12).

The sound collector (15) may be a microphone, a voice recognition sensor, a sonar, an antenna, or an ultrasonic sensor provided in the transmit unit (14). The preset period of time may be 1 sec to 10 sec.

According to the present invention, the security signal is transmitted only when audio information is sensed continuously for a preset period of time in a target area where eavesdropping or recording is expected. Thus, Power consumption of the audio information security system can be minimized. In addition, a negative effect to a human body or unwanted interference on the normal operation of electric device such as a communication device placed in the target area can be minimized.

It should be understood that the present invention is not limited to the above-disclosed exemplary embodiments. It will be apparent to those skilled in the art that numerous modifications and variations can be made in the present invention without departing from the spirit or scope of the appended claims. Accordingly, all such modifications, variations, equivalents are intended to fall within the scope of the present invention.

EXPLANATION OF SYMBOLS

10: Audio information security system
11: Frequency generating unit
12: control unit
13: modulating unit
14: transmit unit
15: sound collector

What is claimed is:

1. An audio information security system, comprising:
a frequency generating unit, a control unit, a modulating unit, and a transmit unit,
wherein the frequency generating unit generates a frequency,
wherein the control unit generates a control signal,
wherein the control signal controls the frequency generated by the frequency generating unit to obtain a security signal,
wherein the security signal has a given wavelength and intensity,
wherein the security signal is a single-channel or a multi-channel security signal,
wherein the control signal further controls a selective transmission of the security signal,
wherein the control signal further controls a transmission of the security signal when target audio information is detected within a target area and the detection continues for a preset period of time,
wherein the modulating unit modulates, according to the control signal from the control unit, the frequency generated by the frequency generating unit to generate the single channel or the multi-channel security signal,
wherein the transmit unit (i) is placed in the target area where eavesdropping or recording is expected, (ii) amplifies the security signal of a preset channel under the control of the control unit and (iii) outputs the amplified security signal to the outside when the modulating unit generates the security signal.

2. The audio information security system of claim 1,
wherein the control unit is a program or a main control unit (MCU) equipped with a logic circuit,
wherein the control unit controls, according to a preset control value, the frequency generated by the frequency generating unit to obtain the single channel or the multi-channel security signal having a given wavelength and intensity,
wherein the control unit further controls the selective transmission of the security signal,
wherein the control unit further controls of transmission of the security signal when the target audio information is detected within the target area where eavesdropping or recording is expected and the detection continues for the preset period of time.

3. The audio information security system of claim 1,
wherein the single-channel security signal is carried on a first channel integrating the entire 19 kHz to 25 kHz band,
wherein the multiple-channel security signal is carried on a second channel obtained by dividing the 19 kHz to 25 kHz band into from 2 to 45 bands or obtained by dividing 20 Hz to 25 kHz bands into from 2 to 45 bands.

4. The audio information security system of claim 1,
wherein the transmit unit comprises an amplifier and a transmitter,
wherein the amplifier amplifies the security signal output from the modulating unit to a given level suitable for transmission to the outside,
wherein the transmitter transmits the security signal to the outside according to the control signal from the control unit.

* * * * *